US012801460B2

(12) United States Patent
Daugherty et al.

(10) Patent No.: US 12,801,460 B2
(45) Date of Patent: Nov. 17, 2026

(54) SYNCHRONIZING SCHEDULING AND DISTRIBUTED SYNCHRONIZED SCHEDULING FOR PROCESSES EXECUTING ON INFORMATION HANDLING SYSTEMS

(71) Applicant: DELL PRODUCTS L.P., Round Rock, TX (US)

(72) Inventors: Daniel Thomas Daugherty, Plano, TX (US); Ricardo Antonio Ruiz, The Colony, TX (US)

(73) Assignee: Dell Products L.P., Round Rock, TX (US)

( * ) Notice: Subject to any disclaimer, the term of this patent is extended or adjusted under 35 U.S.C. 154(b) by 784 days.

(21) Appl. No.: 18/226,235

(22) Filed: Jul. 25, 2023

(65) Prior Publication Data

US 2025/0036484 A1 Jan. 30, 2025

(51) Int. Cl.
*G06F 9/52* (2006.01)
*G06F 9/48* (2006.01)

(52) U.S. Cl.
CPC .............. *G06F 9/52* (2013.01); *G06F 9/4881* (2013.01)

(58) Field of Classification Search
CPC ........ G06F 9/52; G06F 9/4881; G06F 1/3228; G06F 1/324; G06F 1/329; G06F 1/3296; G06F 9/4887; G06F 9/4893
See application file for complete search history.

(56) References Cited

U.S. PATENT DOCUMENTS

| | | | | |
|---|---|---|---|---|
| 8,214,836 B1 * | 7/2012 | Markov | G06F 9/4881 | 718/103 |
| 2008/0244584 A1 * | 10/2008 | Smith | G06F 9/4881 | 718/102 |
| 2014/0137122 A1 * | 5/2014 | Egolf | G06F 9/4893 | 718/102 |
| 2015/0067362 A1 * | 3/2015 | Sultenfuss | G06F 1/30 | 713/320 |
| 2020/0104170 A1 * | 4/2020 | Else | G06F 9/4887 | |
| 2021/0141667 A1 * | 5/2021 | Sekizawa | G06F 9/4887 | |

(Continued)

OTHER PUBLICATIONS

Microsoft, "What is Modern Standby", Mar. 3, 2021, 4 pgs.

(Continued)

*Primary Examiner* — Pierre Vital
*Assistant Examiner* — Tuan M Nguyen
(74) *Attorney, Agent, or Firm* — Egan, Enders & Huston LLP.

(57) ABSTRACT

Systems and methods are provided that may implement at least one instance of a synchronized scheduler logic to synchronize process tasks for a process (e.g., such as an application) executing on a host programmable integrated circuit (e.g., host CPU) of an information handling system in order to minimize the number of wake up cycles of the process and the host programmable integrated circuit from a relatively lower power Modern Standby state to a relatively higher power state. The synchronized scheduler logic may synchronize multiple process tasks of a given process by rescheduling occurrence of at least one of these multiple process tasks such that the multiple process tasks occur within a common window of time (task window), thus reducing the number of wake up (trigger) times for the given process and the host programmable integrated circuit.

16 Claims, 8 Drawing Sheets

(56) References Cited

U.S. PATENT DOCUMENTS

| | | | | |
|---|---|---|---|---|
| 2021/0349762 | A1* | 11/2021 | Kamran | G06F 9/5027 |
| 2021/0374652 | A1* | 12/2021 | Suzuki | G06F 1/329 |
| 2023/0048833 | A1* | 2/2023 | He | G06F 9/45558 |
| 2023/0325234 | A1* | 10/2023 | Arumugam Maharaja | G06F 9/4881<br>718/104 |

OTHER PUBLICATIONS

Atiya, "Modern Standby Could Be Killing Your Laptop While It Sleeps", Jan. 28, 2020, 15 pgs.
Microsoft, Modern Standby Sleepstudy, Jun. 21, 2022, 12 pgs.
Microsoft, "Platform Design for Modern Standby", May 19, 2021, 4 pgs.
Microsoft, "P-States and C-States", May 31, 2018, 1 pg.
Mohta, "What is Modern Standby? Find Out If Your Windows PC Supports It", Jan. 3, 2022, 4 pgs.

* cited by examiner

SYNCHRONIZING SCHEDULING AND DISTRIBUTED SYNCHRONIZED SCHEDULING FOR PROCESSES EXECUTING ON INFORMATION HANDLING SYSTEMS

FIELD

This application relates to information handling systems and, more particularly, to tasks scheduling for information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some computers today implement a low power state known as Microsoft Modern Standby state in which selected system hardware components which are not currently being used (e.g., display device/s, camera, fingerprint reader, etc.) are put to sleep (e.g., at least partially powered down or turned off), and during which one or more processor cores of the system host central processing unit (CPU) may be powered off. For battery-powered computers, inability to enter or remain in Modern Standby may cause undesirable battery drain when it is executed on a central processing unit (CPU) of a battery-powered computer. This battery drain can be caused during Modern Standby state by applications executing on the CPU that "wake up" the hardware components and CPU relatively often. Many applications are event-driven and employ schedulers or timers to carry out periodic tasks by waking up the CPU from the Modern Standby state. If multiple subsystems within a given application are setting up multiple scheduled tasks at different relatively short regular intervals during the Modern Standby state, then the given application will wake up the CPU in a manner that can adversely affect the C and P power states of the computer CPU in a way that increase the battery consumption of the battery-powered computer.

FIG. 1 is an example representation of application tasks that are scheduled over a period of elapsed time by a conventional scheduler for a given application during Modern Standby state on a conventional computer. The duration of elapsed time illustrated by FIG. 1 is sub-divided into columns which each represent a time segment that is shorter than the overall duration of elapsed time shown in FIG. 1. In the conventional example of FIG. 1, there are five application tasks having periodic or non-periodic scheduled trigger times having a frequency provided to the conventional scheduler for each of these tasks by the given application, and which are each represented in FIG. 1 by an "X" in a designated time segment column of each task row. Assuming the application is otherwise idle and not doing anything else, these are the designated time segments where the application will wake up the CPU from a relatively lower power Modern Standby state to a relatively higher power state in order to perform each corresponding application task, as represented by each "X" in the time segment columns of the "wake ups" row. In the example representation of FIG. 1, the application wakes up the CPU from the relatively lower power Modern Standby state to a relatively higher powered state 18 times during the overall elapsed time of FIG. 1 (as represented by the "X"s in the time segment columns of the "wake ups row of FIG. 1). During the intervening time segments between these CPU wake up times, the application is idle and the CPU will return to the relatively lower power Modern Standby state, i.e., the application is idle and the CPU is in the relatively lower power Modern Standby state during each time segment column of the "wake ups" row that does not include a "X".

SUMMARY

Disclosed herein are systems and methods that implement at least one instance of synchronized scheduler logic to synchronize occurrence of process tasks for a process (e.g., such as an application) executing on a host programmable integrated circuit (e.g., host CPU) of an information handling system in order to minimize the number of wake up cycles of the process (i.e. during each of which the process wakes up the host programmable integrated circuit from a relatively lower power Modern Standby state to a relatively higher power state). In one embodiment, the synchronized scheduler logic may synchronize multiple process tasks of a given process by rescheduling occurrence of at least one of these multiple process tasks such that the multiple process tasks occur within a common window of time (task window), thus reducing the number of wake up (trigger) times for the given process and the host programmable integrated circuit within a given elapsed period of time as compared to the number of wake up trigger times for the host programmable integrated circuit that occur when using a conventional application scheduler operating alone. This allows the host programmable integrated circuit to remain at relatively lower power Modern Standby states for a greater portion of the given elapsed period of time as compared to that possible using a conventional application scheduler operating alone.

The disclosed systems and methods may be implemented in one exemplary embodiment with an event-driven process that employs a synchronizing scheduler (e.g., or timer) logic to trigger process tasks, and in a manner that significantly reduces the number of times the process wakes up a given process and the host programmable integrated circuit from a lower relatively lower power Modern Standby state to perform these process tasks. In this way, the disclosed systems and methods may be implemented on a battery powered information handling system to group scheduled tasks so as to maximize process idle-time and limit the number of times the process causes the host programmable integrated circuit and other system components to exit the relatively lower power Modern Standby state, and thus increasing the system battery life.

In one exemplary embodiment, the disclosed systems and methods may be extended to implement a distributed synchronized scheduler logic that distributively synchronizes process tasks for a computing ecosystem of multiple different processes (e.g., applications) simultaneously executing on the same host programmable integrated circuit of the same information handling system. This exemplary embodiment may be implemented distributively such that each different process executes with its own respective synchronizing scheduler, and such that one of the synchronizing schedulers (i.e., corresponding to one of the processes) is designated to act as a cross-process synchronizer. In this exemplary embodiment, the designated cross-process synchronizer may communicate with the respective synchronizing schedulers of the other processes of the computing ecosystem to distributively schedule and synchronize the respective process tasks of all the multiple different processes such that at least some of the respective process tasks of the multiple different processes are scheduled to occur at a common time (e.g., within a common time segment) and during a common wake up time of the host programmable integrated circuit.

Thus, the disclosed systems may be further implemented to multiply the benefits and advantages of the disclosed systems and methods by leveraging and distributing them across an ecosystem of multiple simultaneously-executing processes of a battery-powered computing ecosystem that are working together, e.g., by synchronizing their respective synchronizing schedulers to each other in order to group scheduled tasks across the ecosystem in a manner such that the whole ecosystem wakes up together, and therefore minimizing to an even greater extent the adverse effects on the system battery power that are experience using conventional technology.

In one respect, disclosed herein is a method, including using at least one programmable integrated circuit of an information handling system to: execute a process that implements multiple different process tasks, each of the multiple different process tasks being initially scheduled for performance at a designated target trigger time; reschedule one or more of the target trigger times of the multiple different process tasks to respective actual performance times such that the actual performance times of each of the multiple different process tasks simultaneously occur together with the actual performance times of other of the multiple different process tasks at a common synchronized performance time; and execute the process to simultaneously perform the multiple different process tasks together at the common synchronized performance time. The method may also include operating one or more power-consuming hardware components of the information handling system in a first relatively higher power state when performing any one or more of the multiple different process tasks, and operating the one or more power-consuming hardware components of the information handling system in a second relatively lower power state when not performing any of the multiple different process tasks.

In another respect, disclosed herein is an information handling system, including one or more power-consuming hardware components, and at least one programmable integrated circuit that controls a power state of the one or more power-consuming hardware components. The at least one programmable integrated circuit may be programmed to: execute a process that implements multiple different process tasks, each of the multiple different process tasks being initially scheduled for performance at a designated target trigger time; reschedule one or more of the target trigger times of the multiple different process tasks to respective actual performance times such that the actual performance times of each of the multiple different process tasks simultaneously occur together with the actual performance times of other of the multiple different process tasks at a common synchronized performance time; execute the process to simultaneously perform the multiple different process tasks together at the common synchronized performance time; and operate one or more power-consuming hardware components of the information handling system in a first relatively higher power state when performing any one or more of the multiple different process tasks, and operate the one or more power-consuming hardware components of the information handling system in a second relatively lower power state when not performing any of the multiple different process tasks.

DESCRIPTION OF ILLUSTRATIVE EMBODIMENTS

Figure 2:
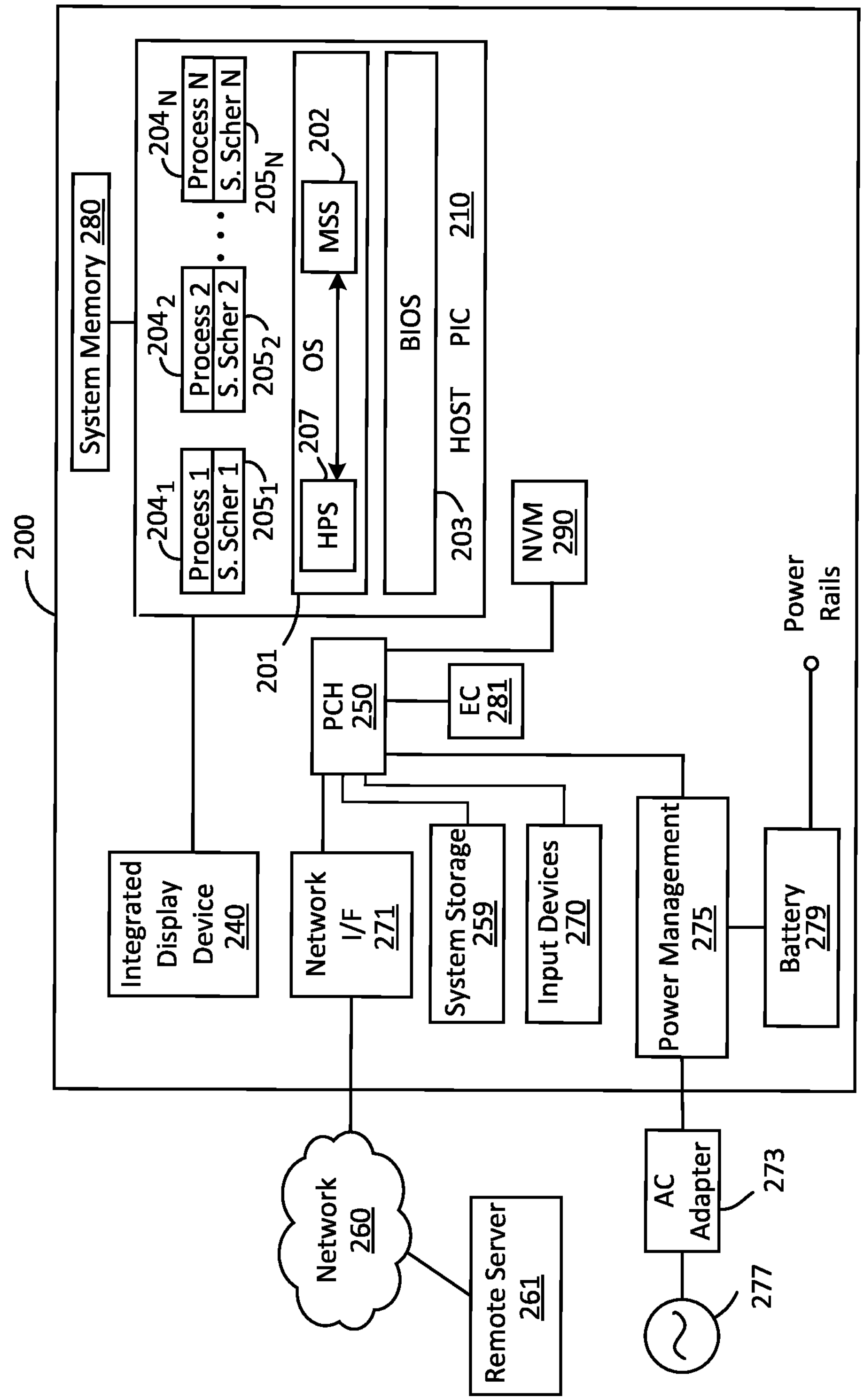
FIG. 2 is a block diagram of a battery-powered information handling system according to one exemplary embodiment of the disclosed systems and methods.

FIG. 2 is a block diagram of a battery-powered information handling system 200 (e.g., notebook computer, laptop computer, tablet computer, smart phone, etc.) as it may be configured according to one exemplary embodiment. In this regard, it should be understood that the configuration of FIG. 2 is exemplary only, and that the disclosed methods may be implemented on other types of information handling systems (e.g., desktop computer, tower computer, all-in-one computer, etc.). It should be further understood that while certain components of an information handling system are shown in FIG. 2 for illustrating embodiments of the disclosed systems and methods, an information handling system implementing the disclosed systems and methods is not restricted to including only those components shown in FIG. 2 and described below. Rather, an information handling system implementing the disclosed systems and methods may include additional, fewer or alternative components.

In the embodiment of FIG. 2, information handling system 200 may include a chassis enclosure (e.g., a plastic and/or metal housing) that encloses internal integrated components of information handling system 200. In this embodiment, information handling system 200 includes a host programmable integrated circuit (PIC) 210, e.g., such as an Intel central processing unit (CPU), an Advanced Micro Devices (AMD) CPU or another type of host programmable integrated circuit. In the embodiment of FIG. 2, host programmable integrated circuit 210 executes logic or code that includes a system basic input/output system (BIOS) 203 and a host operating system (OS) 201 (e.g., proprietary OS such as Microsoft Windows 20, open source OS such as Linux OS, etc.).

Also shown executing on host programmable integrated circuit 210 in FIG. 2 are one or more processes (e.g., such as user applications) $204_1$ to $204_N$ (e.g., email application, calendar application, web conference application, computer game application, note-taking application, photo editing application, message application, word processing application, Internet browser, PDF viewer, spreadsheet application, etc.). Also shown in the embodiment of FIG. 2, is a respective synchronizing scheduler logic $205_1$ to $205_N$ that is provided as part of each respective one of processes $204_1$ to $204_N$ to schedule process tasks for the respective one of processes $204_1$ to $204_N$ (e.g., in a manner as described further herein). Examples of such scheduled process tasks include, but are not limited to, computing tasks that are performed by host programmable integrated circuit 210, e.g., such as executing a telemetry-gathering process (e.g., Dell TechHub available from Dell Technologies, Inc. of Round Rock, Texas) to gather and save system component telemetry data from OS 201 of information handling system 200 to local system storage 259 or to a remote (e.g., cloud) server 261 via a coupled network 260, executing an email application process to check email across a network coupled to information handling system 200, etc.

As shown in FIG. 2, the host programmable integrated circuit 210 may be coupled to an internal (integrated) display device 240, which may be a LCD or LED display, touchscreen or other suitable display device having a display screen for displaying visual images to a user. In this embodiment, integrated graphics capability may be implemented by host programmable integrated circuit 210 using an integrated graphics processing unit (iGPU) to provide visual images (e.g., a graphical user interface, static images and/or video content, etc.) to internal display device 240 for display to a user of information handling system 200. However, in other embodiments, an information handling system 200 may be coupled to provide visual images to an external display device, e.g., via integrated graphics processing unit (iGPU) and/or via an internal discrete graphics processing unit that may be coupled between host programmable integrated circuit 210 and the internal display device 240.

As further shown in FIG. 2, host programmable integrated circuit 210 may be coupled to volatile system memory 280, which may include, for example, random access memory (RAM), dynamic RAM (DRAM), synchronous DRAM (SDRAM). Host programmable integrated circuit 210 may also be coupled to access non-volatile memory 290 (e.g., such as serial peripheral interface (SPI) Flash memory) for purposes such as to load and boot system basic input/output system (BIOS) 203 that is stored thereon, etc.

In FIG. 2, PCH 250 controls certain data paths and manages information flow between components of the information handling system 200. As such, PCH 250 may include one or more integrated controllers or interfaces for controlling the data paths connecting PCH 250 with host programmable integrated circuit 210, local system storage 259, input devices 270 forming at least a part of a user interface for the information handling system 200, network interface (I/F) device 271, embedded controller (EC) 281, and NVM 290, e.g., where BIOS firmware image and settings may be stored together with other components including ACPI firmware, etc. In one embodiment, PCH 250 may include a Serial Peripheral Interface (SPI) controller and an Enhanced Serial Peripheral Interface (eSPI) controller. In some embodiments, PCH 250 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

In the embodiment of FIG. 2, external (peripheral) and/or internal (integrated) input devices 270 (e.g., a keyboard, mouse, touchpad, touchscreen, etc.) may be coupled to PCH 250 of system 200 to enable the system end user to input data and interact with information handling system 200, and to interact with one or more of processes 204 (e.g., user applications) and/or other software/firmware logic executing thereon. Local system non-volatile storage 259 (e.g., one or more media drives, such as hard disk drives, optical drives, NVRAM, Flash memory, solid state drives (SSDs), or any other suitable form of internal or external non-volatile storage) is coupled through PCH 250 to provide non-volatile storage for information handling system 200.

In the embodiment of FIG. 2, the network I/F device 271 enables wired and/or wireless communication with other information handling systems 261 via one or more networks 260, e.g., such as a local area network, a corporate intranet, the Internet, etc.). In one embodiment, network I/F device 271 may be a network interface controller (NIC).

In the illustrated embodiment of FIG. 2, a power source for the information handling system 200 may be provided by an external power source (e.g., mains power 277 and an AC adapter 273) and/or by an optional internal power source, such as a battery 279. As shown in FIG. 2, power management system 275 may be included within information handling system 200 for moderating and switching the available power from the power source/s. In one embodiment, power management system 275 may be coupled to provide operating voltages on one or more power rails to one or more power-consuming hardware components of the information handling system 200, as well as to perform other power-related administrative tasks of the information handling system.

In the embodiment of FIG. 2, embedded controller (EC) 281 is coupled to PCH 250 and may be configured to perform functions such as power and thermal system management, etc. EC 281 may also be configured to execute program instructions to boot information handling system 200, load application firmware from NVM 290 into internal memory, launch the application firmware, etc. In one example, EC 281 may include a microcontroller or other programmable integrated circuit for executing program instructions to perform the above-stated functions.

As shown in FIG. 2, host OS 201 is programmed to execute on host programmable integrated circuit 210 to control power-consuming hardware components of information handling system 200 by transitioning one or more of these power-consuming hardware components back and forth between relatively lower power Modern Standby state (MSS) 202 in which selected power-consuming hardware components which are not currently being used (e.g., display device/s, camera, fingerprint reader, etc.) are put to sleep (e.g., at least partially powered down or turned off), and a relatively higher power state (HSS) 207 in which these power-consuming hardware components are fully awake (e.g., fully powered on).

Host programmable integrated circuit 210 is also a power-consuming hardware component that is programmed to transition to Modern Standby state 202 during the times that no current process tasks are requested or otherwise required of host programmable integrated circuit 210 by any of processes $\mathbf{204}_1$ to $\mathbf{204}_N$ (e.g. during which time these processes are idle). In this regard, the number of active and running cores of host programmable integrated circuit 210 may be reduced during Modern Standby state 202 by powering off a portion of these cores. Host programmable integrated circuit 210 may then transition to the relatively higher power state 201 during which host programmable integrated circuit 210 may turn on the portion of the cores that were turned off during Modern Standby state 202 at those times when any one or more of processes $\mathbf{204}_1$ to $\mathbf{204}_N$ request or otherwise require process task/s to be executed by host programmable integrated circuit 210.

As such, information handling system 200 consumes less power when operating in the relatively lower power Modern Standby state 202 than when operating in a relatively higher power state 207, and therefore, consumes less power from battery 279 when operating in the relatively lower power Modern Standby state 202 than when operating in a relatively higher power state 207.

Figure 3:
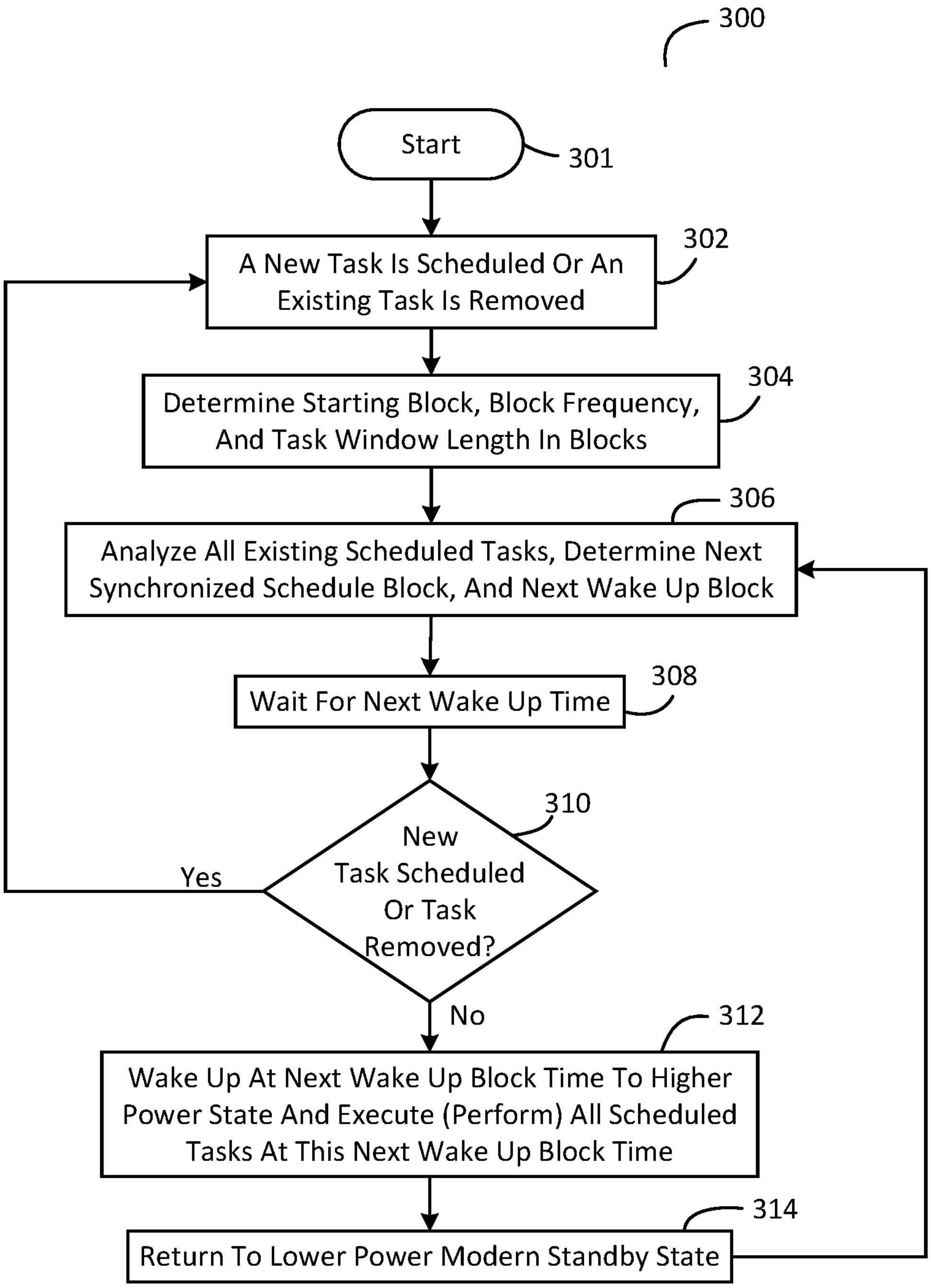
FIG. 3 illustrates methodology according to one exemplary embodiment of the disclosed systems and methods.
Figure 4:
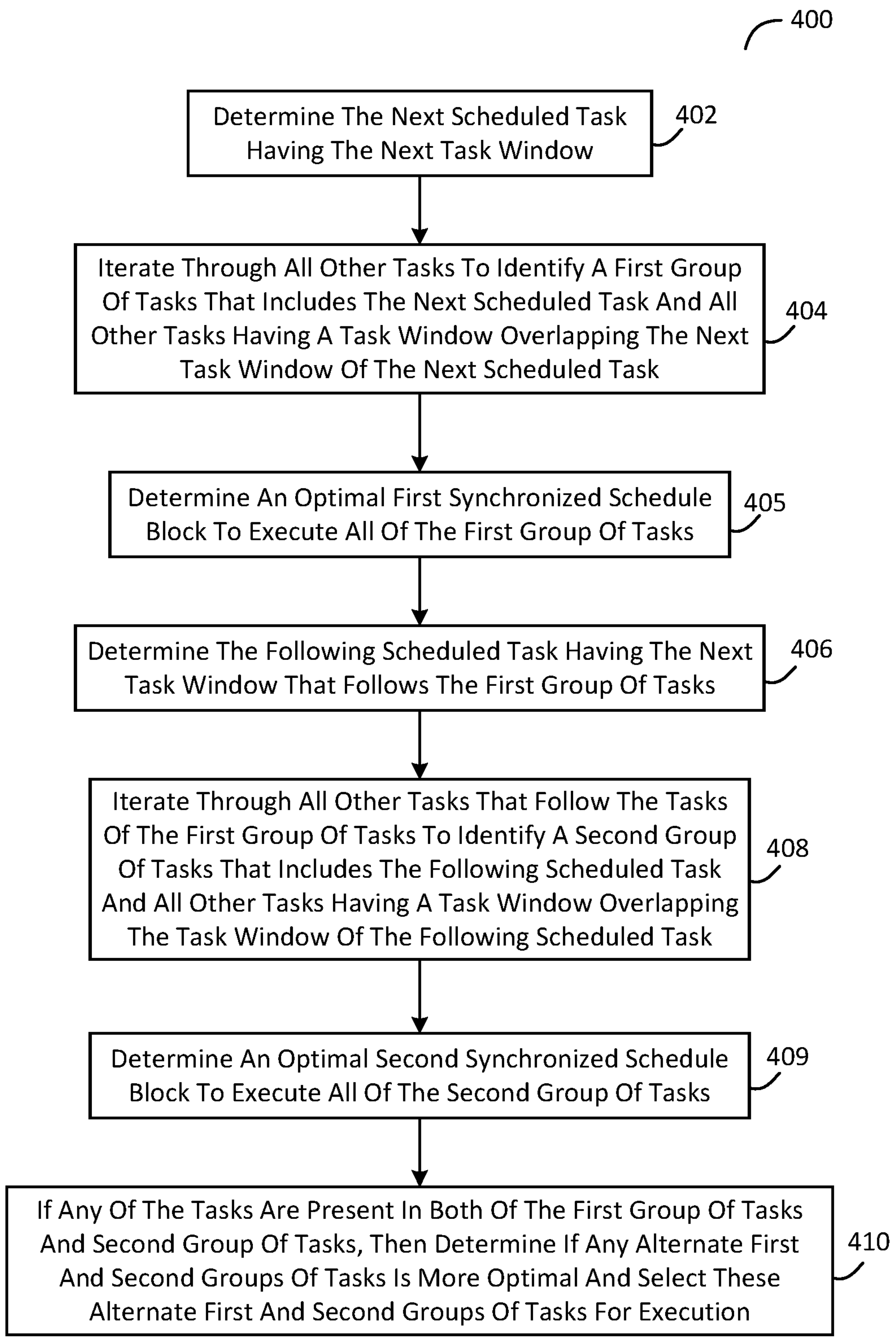
FIG. 4 illustrates methodology according to one exemplary embodiment of the disclosed systems and methods.
Figure 5:
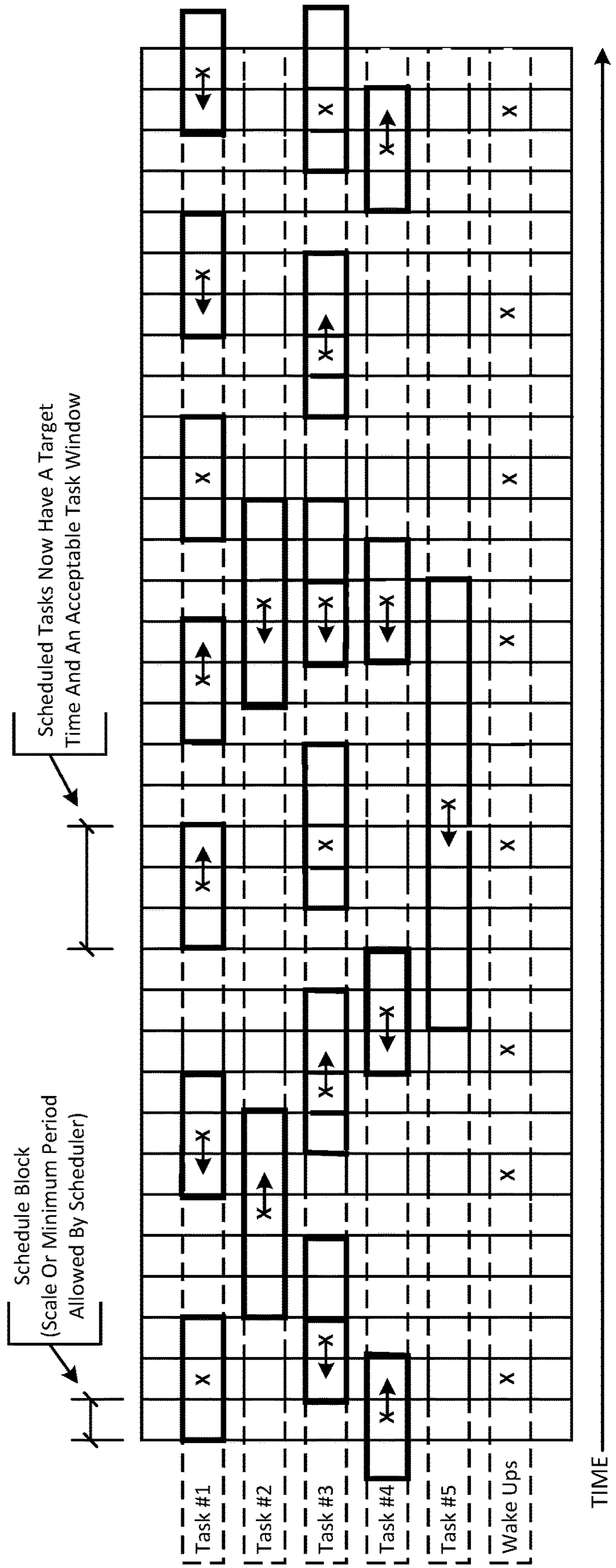
FIG. 5 is a representation of process tasks as they may be scheduled over a period of elapsed time by a synchronized scheduler logic according to one exemplary embodiment of the disclosed systems and methods.

FIGS. 3 and 4 illustrate flowcharts of exemplary iterative methodologies (each represented as a sequence of boxes) that may be implemented by a respective synchronized scheduler logic 205 of a given one of processes 204 of information handling system 200 to schedule process tasks for its given process 204. FIGS. 3 and 4 are described herein in reference to FIG. 5, which is a representation of an exemplary number of five process tasks as they may be scheduled over a period of elapsed time by the respective synchronized scheduler logic 205 of the given one of processes 204. It will be understood that the number of process tasks illustrated in FIG. 5 is exemplary only, and that the number of process tasks at any given time may be greater or lesser than five, and that the number of process tasks may change over time, e.g., as new process tasks are added and/or as existing process tasks are removed.

With reference to the description and figures herein, the following terminology is used:

- "Scale" is the minimum period permitted by an instance of synchronized scheduler logic 205, and may be predefined during process software/firmware design.
- "Schedule Blocks" are the respective blocks of time available for scheduling of process tasks. Schedule blocks are defined to be equal to the scale. For example, if the scale is 250 ms, then schedule blocks are available every 250 ms. It will be understood that any greater or lesser scale may alternatively selected based on design choices such as how much reduction in battery power consumption is desired.
- "Target Schedule Block" is a schedule block (e.g., based on a starting time provided by a given process 204) that is initially scheduled as a target scheduled time for performance of a given scheduled process task. For example, if the scale is 250 ms, a given process task that is initially scheduled to occur at a frequency of every 5 schedule blocks (+/−1 schedule block), then the given process task is initially scheduled to occur every 1250 ms (+/−250 ms).
- "Synchronized Schedule Block" is a schedule block that is calculated and identified by an instance of synchronized scheduler logic 205 as an active block which will wake up the process to perform one or more scheduled process task/s.
- "Task Window" is a window of time (e.g., a number of schedule blocks) defined around a target schedule block (e.g., target scheduled time) for a given process task (e.g., by its given process 204). In one embodiment, a given process 204 may define a custom task window around the corresponding target scheduled time (e.g., target scheduled block) for each of its scheduled process tasks. This window defines the tolerance of the process task for moving from one block to another, which can affect the consistency of the frequency in which the process task is executed. In one embodiment, the defined length (e.g., number of schedule blocks) of such a custom task window may be dictated by (and selected according to) the purpose of the corresponding process task, and different scheduled process tasks may have respective defined custom task windows of different lengths. The length and time of each task window may be predefined during process software/firmware design, at compile time, and/or at run time.
- "Cross-Process Synchronizer" is an instance of a synchronizing scheduler logic 205 which is designated (selected and/or predefined) to act as a master global distributed synchronizer for a group of multiple synchronizing scheduler logic instances 205 of respective multiple different individual processes 204 executing on the same host programmable integrated circuit 210.

Methodology 300 of FIG. 3 starts in box 301 with no existing process tasks scheduled for the given process 204. In box 302, a new process task to be performed by host programmable integrated circuit 210 is scheduled by the given process 204 and task information regarding the new process task is provided to its respective given instance of synchronizing scheduler logic 205, e.g., with identity of the new process task, target starting time of the new process task, repeating time frequency (e.g., time period) of the new process task, and task window time length of the new process task.

Next, in box 304, the given synchronizing scheduler logic 205 of process 204 adjusts the provided starting time of the new process task to a corresponding target starting schedule block for the new process task, adjusts the provided repeating time frequency of the new process task to a repeating frequency (e.g., period) of target schedule blocks for performance of the new process task, and adjusts the task window time length of the new process task to a task window defined in number of schedule blocks for the new process task on either side of the target starting schedule block for the new process task. FIG. 5 is an example representation of scheduling information created in box 304 by the given synchronizing scheduler logic 205 of process 204 (i.e., for each of the process tasks that are first scheduled in box 302 by a given process 204, and then adjusted in box 304 by the given synchronizing scheduler logic 205 of process 204) to occur over a duration of elapsed time that is equal to the duration of elapsed time shown in the conventional scheduling representation of FIG. 1.

Figure 1:
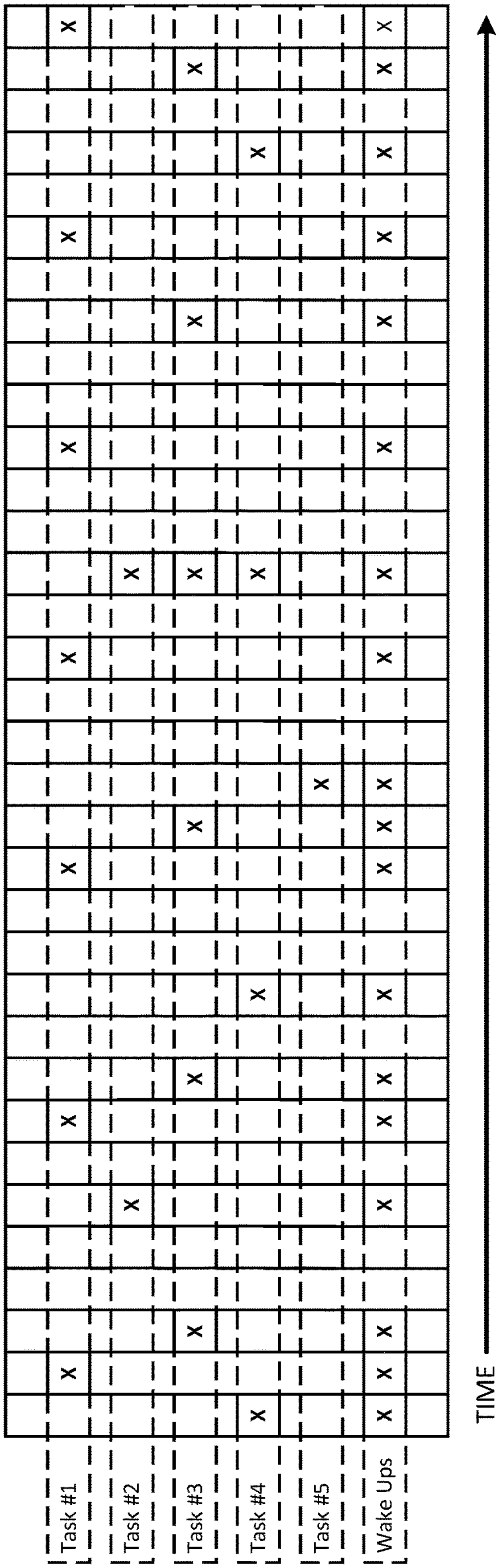
FIG. 1 (Prior Art)
FIG. 1 illustrates an example representation of application tasks that are scheduled over a period of elapsed time by a conventional scheduler for a given application.

In the example of FIG. 5, the same five process tasks shown in FIG. 1 are initially scheduled to occur at the same times as shown in FIG. 1. In FIG. 5, the duration of elapsed time illustrated by FIG. 5 is sub-divided into columns which each represent a schedule block (e.g., corresponding to the scale of the given synchronizing scheduler 205 of the given process 204) that is shorter than the overall duration of elapsed time shown in FIG. 5, e.g., every column of FIG. 5 is defined by the scale of synchronized scheduler logic 205 and it represents a schedule block. In FIG. 5, there are currently five process tasks having periodic or non-periodic target schedule blocks determined or otherwise designated as target times (also referred to herein as "target trigger times") in box 304 by the given synchronizing scheduler 205 of the given process 204, and which are each represented by an "X" in a designated schedule block column of each process task row.

Still referring to FIG. 5, every process task has a target schedule block (represented by a "X" in process task rows in FIG. 5) and a task window (represented in FIG. 5 by a bolded horizontal box around the target schedule block "X" in each process task row) that is defined by its given process 204. In this regard, a task window is defined as a number of schedule blocks around each target schedule block of the five processes as shown in FIG. 5 by the dashed boxes defined around each target schedule block "X" in the corresponding row of each of the five processes.

Returning to FIG. 3, methodology 300 next proceeds to box 306, where the scheduling information of all of the existing scheduled process tasks is analyzed together by the given synchronizing scheduler 205 of the given process 204 to determine a next synchronized schedule block for actually performing one or more of the five current process tasks, and a corresponding next wake up block time corresponding to this synchronized schedule block for the given process 204, e.g., as illustrated and described further herein in relation to FIG. 4. Synchronized schedule blocks determined over time in successive iterations of box 306 of methodology 300 are represented by those schedule block columns of FIG. 5 that include a "X" in the "Wake ups" row of FIG. 5.

In FIG. 5, arrows illustrate how in box 306 of methodology 300 actual performance times for each of a group of individual multiple process tasks may be moved (e.g., shifted forward or backwards in time from their target trigger times) within their respective task window so that the actual performance times of the group of multiple process tasks vertically align so as to occur simultaneously within the same common synchronized schedule block, i.e., so that they are now scheduled to occur simultaneously. Assuming the given process 204 is otherwise idle and not doing anything else, these are the designated schedule blocks where the process will wake up the host programmable integrated circuit 210 from a relatively lower power Modern Standby state to a relatively higher power state in order to simultaneously perform the indicated process tasks in a common synchronized schedule block, as represented by each "X" in the synchronized schedule block columns of the "wake ups" row in FIG. 5.

Next, in box 308, methodology 300 waits for the next upcoming wake up time which is indicated by the next upcoming "X" in a synchronized schedule block column of the "wake ups" row in FIG. 5. While waiting for occurrence of the next upcoming wakeup time, the given process 204 may be idle and the host programmable integrated circuit may be in the relatively lower power Modern Standby state. Also, while waiting for occurrence of the next upcoming wakeup time, the given synchronized scheduler 205 determines in box 310 whether a new process task has been added to the scheduled process tasks by the given process 204 (e.g., a sixth process task added to the existing five scheduled process tasks of FIG. 5), or whether an existing process task has been removed from the scheduled process tasks by the given process 204 (e.g., one of the existing five process tasks of FIG. 5 removed from the scheduled process tasks of FIG. 5).

If in box 310, it is determined that no new process task has been added and no existing process task has been removed, then methodology 300 proceeds to box 312 where, at the time of occurrence of the next wake up block time and synchronized schedule block, the given process 204 transitions from idle to active and wakes up the host programmable integrated circuit 210 from Modern Standby state to a relatively higher power state in order to perform the multiple process tasks scheduled for the current synchronized schedule block and wake up time. Then, in box 314, after performing the multiple process tasks scheduled for the current synchronized schedule block and wake up time, the given process 204 transitions from active state to idle state and the host programmable integrated circuit 210 transitions from the relatively higher power state to the relatively lower power Modern Standby state. Methodology 300 then returns to box 306 and iteratively repeats as before. However, if in box 310, it is determined that at least one new process task has been added and/or at least one existing process task has been removed, then methodology 300 returns immediately back to box 302 and iteratively repeats as shown.

In the embodiment of FIG. 3, any time a new process task is added (or after a wake up and process task execution event has been completed), the given instance of synchronizing scheduler logic 205 iteratively analyzes the currently-scheduled process tasks, determines when the next wake up time occurs, and determines which particular process tasks will be executed at the next upcoming wake up time occurrence (e.g., at the time of the next synchronized schedule block of FIG. 5).

In the example representation of FIG. 5, the given process 204 wakes up the host programmable integrated circuit 210 from the relatively lower power Modern Standby state to a relatively higher powered state a total of 8 times during the overall elapsed time of FIG. 5 (as represented by the "X"s in the synchronized schedule blocks of the "wake ups row of FIG. 5). During the intervening schedule blocks between these wake up times, the given process 204 is idle and the host programmable integrated circuit 210 will return to the relatively lower power Modern Standby state, i.e., the given process 210 is idle and the host programmable integrated circuit 210 is in the relatively lower power Modern Standby state during each schedule block column of the "wake ups" row that does not include a "X".

In contrast to the embodiment of FIG. 5, 18 scheduled wake up times result when using a conventional scheduler of FIG. 1 to schedule the same five process tasks. Thus, the embodiments of FIGS. 3 and 5 show how the disclosed synchronized scheduler logic 105 of FIG. 2 may implement methodology 300 of FIG. 3 to reorganize these same scheduled process tasks of the same five processes so that only 8 wake up times occur during the same elapsed time as FIG. 1, thus increasing the time that the given process 204 is idle and that the host programmable integrated circuit 210 is enabled to enter a relatively lower power Modern Standby state where less power is consumed.

FIG. 4 illustrates one exemplary embodiment of a methodology 400 that may be implemented (e.g., during box 306 of FIG. 3) to analyze the scheduling information (e.g., from box 304) for all of the existing scheduled process tasks in order to determine a next synchronized schedule block and next wake up time for a given process 204. In one embodiment, the methodology 400 of FIG. 4 may be performed, for example, by a given synchronized scheduler logic 205 of a given one of processes 204 of information handling system 200.

As shown in FIG. 4, methodology 400 starts in box 402 where synchronized scheduler logic 205 analyzes the current (e.g., real time) scheduling information (e.g., of FIG. 5) for all of the existing upcoming scheduled process tasks of the given process 204 (e.g., as they exist at the current time) to determine the next scheduled process task having the next (e.g., first upcoming) task window. Next, in box 404, synchronized scheduler logic 205 iterates though all the other process tasks (e.g., of FIG. 5) to identify a first group (e.g., subset) of process tasks that includes the next scheduled process task of box 402 and all other process tasks having a respective task window that overlaps with the next task window of the next scheduled process task that was identified in box 402. Then, in box 405, synchronized scheduler logic 205 determines an optimal first synchronized schedule block to simultaneously execute all of the first group of process tasks of box 404. In box 405, synchronized scheduler logic 205 determines the identity of this optimal first synchronized block as being the single schedule block which is closest in time to the target schedule blocks of all the first group of process tasks, i.e., that requires smallest adjustments or movements to the times of the respective target schedule blocks of the first group of process tasks.

Figure 7:
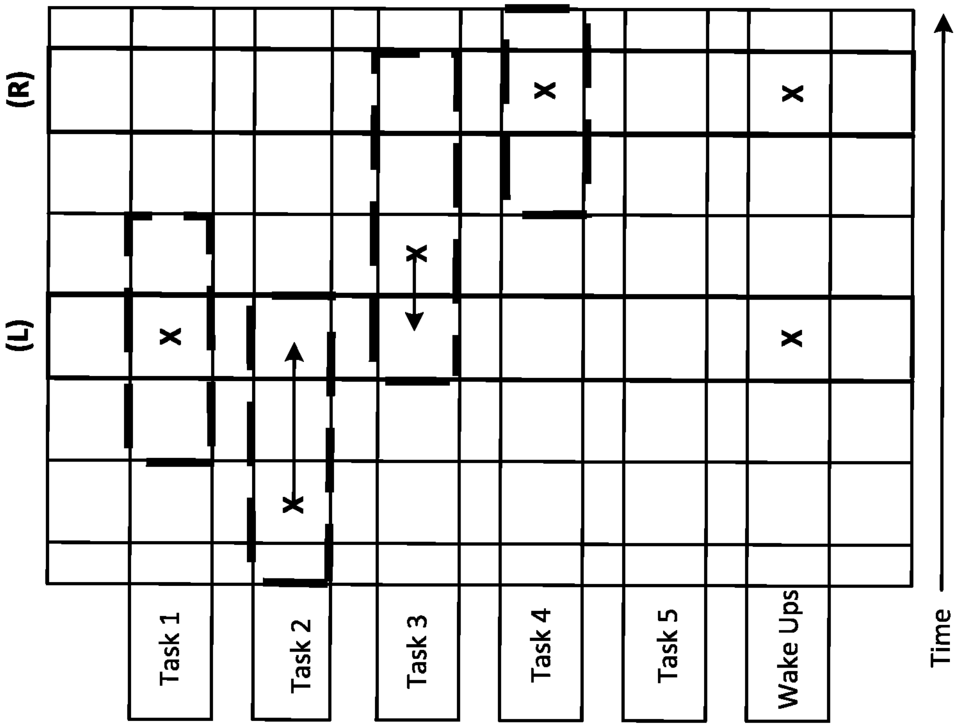
FIG. 7 illustrates a non-optimal synchronized schedule block according to one exemplary embodiment of the disclosed systems and methods.
Figure 6:
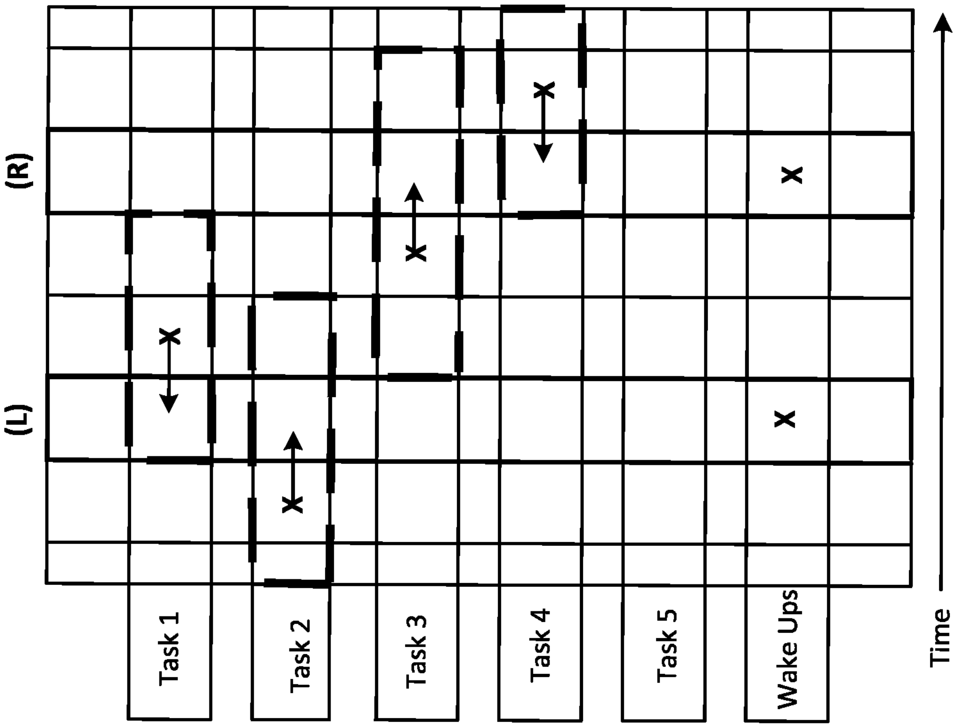
FIG. 6 illustrates determination of an optimal synchronized schedule block according to one exemplary embodiment of the disclosed systems and methods.

As an example of performance of box 405, FIG. 6 illustrates 404 determination of an optimal leftmost (or first) synchronized schedule block (L) for an example first group of process tasks 1 to 4 that have been identified in box 402. For comparison purposes, FIG. 7 illustrates what would be a non-optimal leftmost (or first) synchronized schedule block (L) for the same identified first group of process tasks 1 to 4 of box 402. In this regard, the leftmost first synchronized schedule block (L) of FIG. 6 is optimal because it requires the smallest adjustment from the target schedule blocks of the first group of process tasks (i.e., which are identified with an "X" in each of the rows of process tasks 1 to 4) to the leftmost first synchronized schedule block (L) of FIG. 6. Selection of the leftmost first synchronized schedule block (L) of FIG. 6 is optimal as it requires the smallest adjustment from the target schedule block times of the each of the first group of process tasks 1 to 4, i.e., since the execution time of each of the first group of process tasks 1 to 4 need only be moved one block to from its respective target schedule block time to the selected leftmost first synchronized schedule block (L) of FIG. 6 (as shown by each of the arrows in FIG. 6).

In contrast to FIG. 6, a selection of the leftmost first synchronized schedule block (L) illustrated in FIG. 7 would be non-optimal because it does not require the smallest adjustment from the target schedule block times of the first group of process tasks to the leftmost first synchronized schedule block (L) of FIG. 7, i.e., since the execution time of process task 2 of the first group of process tasks 1 to 4 needs to be moved two blocks from its respective target schedule block time to the selected leftmost first synchronized schedule block (L) of FIG. 7 (as shown by the leftmost process task 2 arrow in FIG. 7).

Returning to FIG. 4, methodology 400 proceeds from box 405 to box 406, where the scheduling information (e.g., of FIG. 5) is again analyzed by synchronized scheduler logic 205 for all of the other existing upcoming scheduled process tasks that follow the scheduled process tasks of the first group of process tasks of the given process 204 to determine the next following scheduled process task having the next following task window that follows the first group of scheduled process tasks. Next, in box 408, synchronized scheduler logic 205 iterates though all the other scheduled process tasks that follow the scheduled process tasks of the first group of process tasks to identify a second group of process tasks that includes the next following scheduled process task of box 406 and all other process tasks having a respective task window that overlaps with the next following task window that was identified in box 406. In this regard, synchronized scheduler logic 205 may identify and analyze the next upcoming two groups of scheduled process tasks in order to resolve or otherwise determine the optimal groupings of the first and second groups of scheduled process tasks, e.g., as described further herein in relation to box 410 of methodology 400.

In box 409, synchronized scheduler logic 205 determines an optimal second synchronized schedule block to simultaneously execute all of the second group of process tasks. Synchronized scheduler logic 205 determines the identity of this optimal second synchronized block as being the single schedule block which is closest to the target schedule blocks of all the second group of process tasks, i.e., that requires smallest adjustments or movements to the times of the respective target schedule blocks of the second group of process tasks. FIG. 6 shows an example of a selected optimal rightmost (R) second synchronized schedule block of box 408 to simultaneously execute all of the second group of process tasks, and that follows a selected optimal leftmost (L) first synchronized schedule block of box 404.

Next, in box 410 of methodology 400, synchronized scheduler logic 205 determines if any one or more process tasks are present in each of the first and second groups of process tasks that were determined in respective boxes 404 and 408. If not, then methodology 400 ends at this time. However, if any one or more process tasks are present in each of the first and second groups of process tasks, then synchronized scheduler logic 205 determines if any alternate first and second groupings of process tasks would be more optimal, i.e. determines if any alternate first and second groupings of the same process tasks would require a smaller adjustment from the target schedule block times of these same process tasks to the first and second synchronized schedule blocks as compared to the required adjustment from the target schedule block times of these same process tasks to each of the first and second synchronized schedule blocks as required by the determinations made in boxes 402 to 409. If so, synchronized scheduler logic 205 then selects the so-determined more optimal alternate first and second groupings of the same process tasks for execution in the respective first and second synchronized schedule blocks, and methodology 400 ends at this time.

Figure 8:
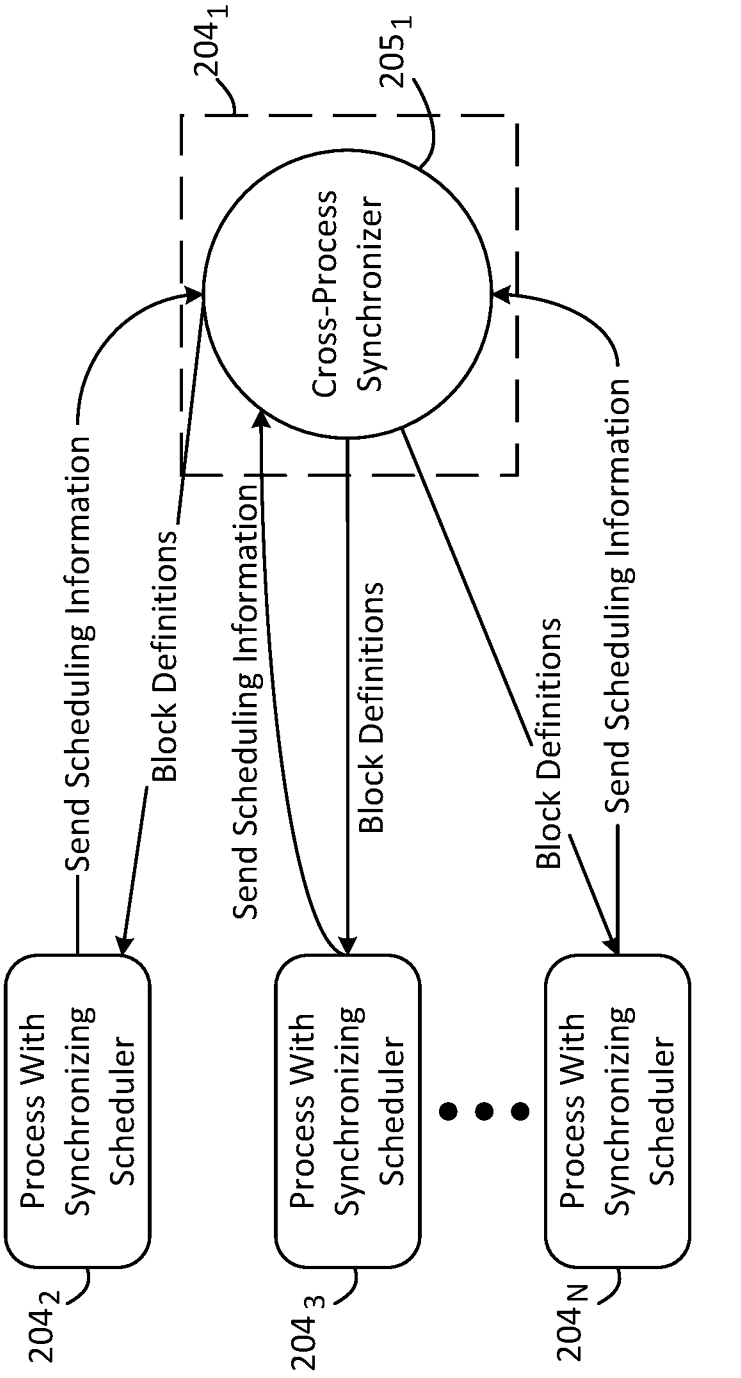
FIG. 8 illustrates methodology according to one exemplary embodiment of the disclosed systems and methods.

FIG. 8 illustrates a flowchart and block diagram of one exemplary embodiment of an architecture and process flow 800 that may implement a distributed synchronized scheduler methodology to schedule process tasks of multiple different processes 204$_1$ to 204$_N$ (e.g., different applications) that are simultaneously executing on the same host programmable integrated circuit 210 of common information handling system 200. In this exemplary embodiment, multiple different instances of synchronized scheduler logic 205$_1$ to 205$_N$ (corresponding to respective multiple different processes 204$_1$ to 204$_N$) may together implement the distributed synchronized scheduler methodology of FIG. 8 to distributively synchronize and schedule process tasks for each of these multiple different processes 204$_1$ to 204$_N$.

In the embodiment of FIG. 8, one instance of a synchronized scheduler logic 205$_1$ to 205$_N$ is first designated (e.g., selected and/or predefined) to be a master cross-process synchronizer for the multiple different instances of synchronized scheduler logic $205_1$ to $205_N$. As shown in FIG. 8, this designated cross-process synchronizer may be a selected instance of synchronized scheduler logic 205 in one of the different processes $204_1$ to $204_N$, e.g. synchronized scheduler logic $205_1$ in process $204_1$ is designated as a cross-process synchronizer in the embodiment of FIG. 8. In such an embodiment, this designated cross-process synchronizer may optionally also act as an instance of synchronized scheduler logic $205_N$ for the processes of its respective process $204_N$. However, in other embodiments a designated cross-process synchronizer may be a stand-alone instance of synchronized scheduler logic that does not correspond to any one of the different processes $204_1$ to $204_N$.

As shown in FIG. 8, the different instances of synchronized scheduler logic $205_2$ to $205_N$ of the respective different processes $204_2$ to $204_N$ may use using any suitable interprocess communication (IPC) mechanism to communicate and interact with the designated cross-process synchronizer $205_1$ so that designated cross-process synchronizer $205_1$ may determine (e.g., calculate) common optimal synchronized schedule blocks for executing the process tasks of all of the different processes $204_1$ to $204_N$, i.e., such that it results in common wake up times for executing process tasks across the full collection (or group) of processes $204_1$ to $204_N$. In this embodiment, each given instance of synchronized scheduler logic $205_1$ to $205_N$ executes its own instances of methodology 300 and methodology 400 (of respective FIGS. 4 and 5) for the given process tasks of its own given respective process $204_1$ to $204_N$, e.g., by using the task information provided to the given instance of synchronized scheduler logic $205_1$ to $205_N$ in box 302 of FIG. 3 for each of the given process tasks by the given respective process $204_1$ to $204_N$.

As an example of the interaction illustrated in FIG. 8 between instances of synchronized scheduler logic $205_1$ to $205_N$, each of the individual instances of synchronized scheduler logic $205_2$ to $205_N$ may use any suitable IPC mechanism to send their respective scheduling information (e.g., target starting schedule blocks and respective task windows for each of their respective existing scheduled process tasks determined in block 304 of their respective instance of methodology 300) to common cross-process synchronizer $205_1$ as shown in FIG. 8. The designated cross-process synchronizer $205_1$ then selects a common scale to be used by all the processes of all instances of processes $204_1$ to $204_N$. Then the designated cross-process synchronizer $205_1$ executes the same methodologies 300 and methodology 400 to analyze together the scheduling information of all of the existing scheduled process tasks of respective process $204_1$ to $204_N$ to determine a next synchronized schedule block for actually performing one or more of the process tasks of processes $204_1$ to $204_N$, and a corresponding next wake up block time corresponding to this synchronized schedule block for the given process/es $204_1$ to $204_N$. Designated cross-process synchronizer $205_1$ may then use any suitable IPC mechanism to send the identity of this determined next synchronized schedule block and the determined corresponding next wake up block time corresponding to this synchronized schedule block to each of the given process/es $204_1$ to $204_N$ (e.g., as block definition information) as shown in FIG. 8. The result of the methodology in FIG. 8 is a reduction in the wakeup times across all the processes $204_1$ to $204_N$ by synchronizing the wakeup blocks across them. Therefore, using the distributed synchronized scheduler methodology, of FIG. 8, the positive effects on system battery life may be multiplied by minimizing the wakeup times across a full ecosystem of processes $204_1$ to $204_N$.

Figure 9:
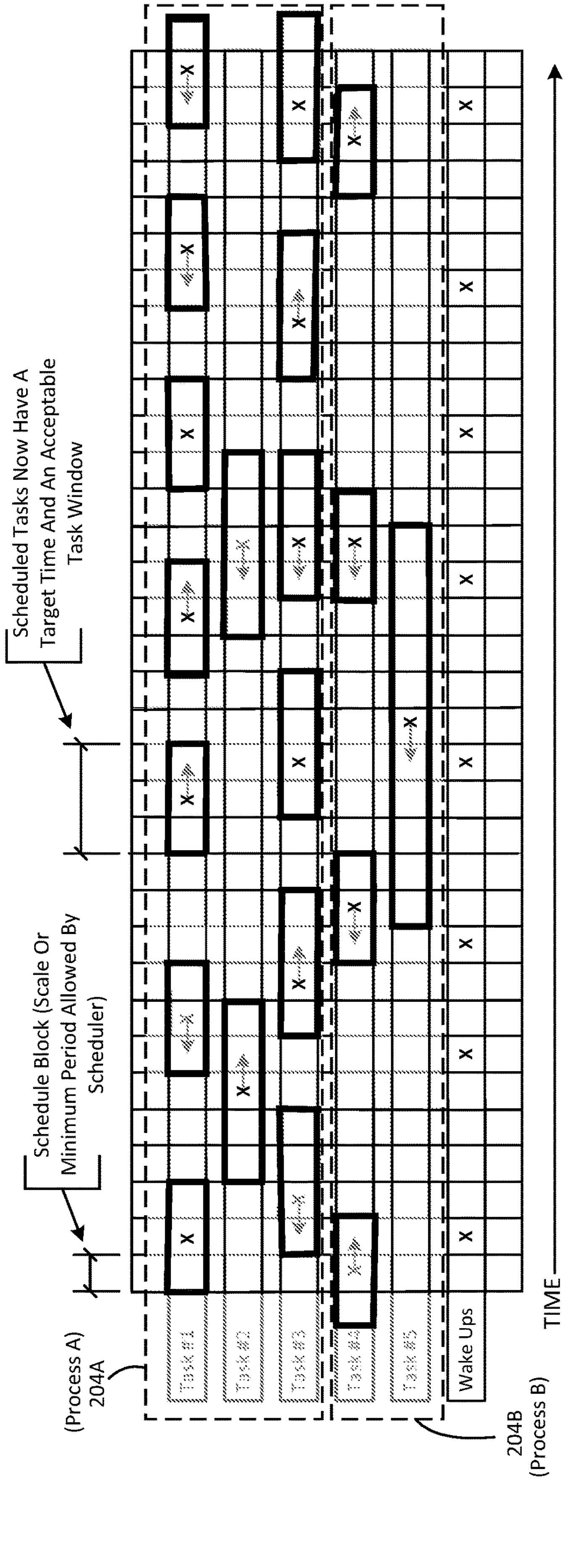
FIG. 9 is a representation of process tasks as they may be scheduled over a period of elapsed time by a distributed synchronized scheduler logic according to one exemplary embodiment of the disclosed systems and methods.

FIG. 9 is an example representation of distributed scheduling information created by a designated cross-process synchronizer 205 according to the embodiment of FIG. 8 for multiple process tasks of two different processes 204A and 204B that are simultaneously executing on host programmable integrated circuit 210. Synchronized schedule blocks (i.e., corresponding to wake up block times) determined over time by the designated cross-process synchronizer 205 of FIG. 9 (e.g., in successive iterations of methodology 300) are those schedule block columns of FIG. 9 that include a "X" in the "Wake ups" row of FIG. 9 (in similar manner as shown in FIG. 5).

As just one hypothetical example of an implementation of the disclosed systems and methods, first assume a given process (e.g., an application) executing on a host programmable integrated circuit of a battery-powered information handling system has 20 process tasks that it has independently-scheduled so that without adjustment they would collectively occur (trigger) and wake up the host programmable integrated circuit from Modern Standby state 30 times in one second within a relatively higher powered state. Using the disclosed systems and methods, a synchronizing scheduler of this given process may reschedule and synchronize at least some of these above process tasks to occur (trigger) together within a common task window so as to reduce the number of wake up triggers within the one second period of time in order to allow the host programmable integrated circuit to remain at a relatively lower powered Modern Standby state for a longer period of time during the one second period of time. Accordingly, then assume that the 20 process tasks are analyzed and grouped by the synchronizing scheduler of the given process to occur (trigger) during three wakeup times over which all 20 process tasks are executed so that they trigger wake up of the host programmable integrated circuit from a relatively lower powered Modern Standby state to a relatively higher powered state only three times in a second and thus reduce battery power consumption from a battery of the information handling system.

It will be understood that one or more of the tasks, functions, or methodologies described herein (e.g., including those described herein for components 200, 201, 202, 203, 204, 205, 207, 210, 240, 250, 259, 260, 261, 270, 271, 273, 275, 279, 280, 281, 290, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising using at least one programmable integrated circuit of an information handling system to:
- execute a process that implements multiple different process tasks, each of the multiple different process tasks being initially scheduled for performance at a designated target trigger time;
- reschedule one or more of the target trigger times of the multiple different process tasks to respective actual performance times such that the actual performance times of each of the multiple different process tasks simultaneously occur together with the actual performance times of other of the multiple different process tasks at a common synchronized performance time, where the one or more of the target trigger times of the multiple different process tasks are rescheduled by using the at least one programmable integrated circuit to:
  - define sequential blocks of time as sequential schedule blocks that are available for scheduling of process tasks;
  - define each of the target trigger times for each given process task as respective target schedule blocks for the given process task;
  - define the common synchronized performance time as a synchronized schedule block for performing the multiple different process tasks together at the common synchronized performance time;
  - define a respective window of time as a task window around the target schedule block of each of the multiple different process tasks;
  - identify a next scheduled process task having the next upcoming task window of all the task windows of the multiple different process tasks;
  - determine a first group of the multiple different process tasks that includes the next scheduled process task and all other of the multiple different process tasks that have a respective task window that overlaps in time with the next upcoming task window of the identified next scheduled process task;
  - determine a first synchronized schedule block as the schedule block that is closest in time to the target schedule blocks of all the first group of the multiple different process tasks; and
- execute the process to simultaneously perform the multiple different process tasks together at the time of the first synchronized schedule block;
- where the method further comprises operating one or more power-consuming hardware components of the information handling system in a first power state when performing any one or more of the multiple different process tasks, and operating the one or more power-consuming hardware components of the information handling system in a second power state when not performing any of the multiple different process tasks, where the first power state is higher than the second power state.

2. The method of claim 1, where the one or more of the target trigger times of the multiple different process tasks are further rescheduled by using the at least one programmable integrated circuit to:
- identify a next following scheduled process task having the next upcoming following task window that follows all of the target schedule blocks of the first group of the multiple different process tasks;
- determine a second group of the multiple different process tasks that includes the next following scheduled process task and all other of the multiple different process tasks that have a respective task window that overlaps in time with the next upcoming following task window of the identified next following scheduled process task;
- determine a second synchronized schedule block as the schedule block that is closest in time to the target schedule blocks of all the second group of the multiple different process tasks; and
- where the method further comprises using the at least one programmable integrated circuit to execute the process to simultaneously perform the second group of the multiple different process tasks together at the time of the second synchronized schedule block, and after executing the process to simultaneously perform the first group of the multiple different process tasks together at the time of the first synchronized schedule block.

3. The method of claim 1, where the one or more of the target trigger times of the multiple different process tasks are further rescheduled by using the at least one programmable integrated circuit to:

identify a next following scheduled process task having the next upcoming following task window that follows all of the target schedule blocks of the first group of the multiple different process tasks;

determine a second group of the multiple different process tasks that includes the next following scheduled process task and all other of the multiple different process tasks that have a respective task window that overlaps in time with the next upcoming following task window of the identified next following scheduled process task;

determine a second synchronized schedule block as the schedule block that is closest in time to the target schedule blocks of all the second group of the multiple different process tasks;

determine if at least one of the multiple different process tasks is included in both the first group of the multiple different process tasks and the second group of the multiple different process tasks;

then only if at least one of the multiple different process tasks is included in both the first group of the multiple different process tasks and the second group of the multiple different process tasks, then determine if any combination of a different first group and a different second group of the same multiple different process tasks results in a smaller time adjustment from the target schedule blocks of all of the multiple different process tasks to the first and second synchronized scheduled blocks than does the determined first and second groups of the multiple different process tasks; and then only if it is determined that a combination of the different first group and the different second group results in a smaller time adjustment from the target schedule blocks of all of the multiple different process tasks, then execute the process to simultaneously perform the different first group of the multiple different process tasks together at the time of the first synchronized schedule block, and execute the process to simultaneously perform the different second group of the multiple different process tasks together at the time of the second synchronized schedule block.

4. The method of claim 1, wherein after the one or more of the target trigger times of the multiple different process tasks are rescheduled and before the process is executed, the method further comprising using the at least one programmable integrated circuit to:

respond to a change to the multiple different existing process tasks that occurs due to at least one of an addition of a new process task to the multiple different existing process tasks or a removal of an existing process task from the multiple different existing process tasks, by rescheduling one or more of the target trigger times of the changed multiple different existing process tasks to respective actual performance times such that the actual performance times of each of the changed multiple different existing process tasks simultaneously occur together with the actual performance times of other of the changed multiple different existing process tasks at an updated common synchronized performance time; and execute the process to simultaneously perform the multiple different process tasks together at the updated common synchronized performance time.

5. The method of claim 1, further comprising using the at least one programmable integrated circuit to:

simultaneously execute multiple different processes that each implements multiple different process tasks, each of the multiple different process tasks of the simultaneously-executing multiple different processes being initially scheduled for performance at a designated target trigger time;

reschedule one or more of the target trigger times of the multiple different process tasks of each of the simultaneously-executing multiple different processes to respective actual performance times such that the actual performance times of each of the multiple different process tasks of the simultaneously-executing multiple different processes simultaneously occur together with the actual performance times of each other of the multiple different process tasks of the simultaneously-executing multiple different processes at a common synchronized performance time; and execute the simultaneously-executing multiple different processes to simultaneously perform the multiple different process tasks of the simultaneously-executing multiple different processes together at the common synchronized performance time;

where the method further comprises operating the one or more power-consuming hardware components of the information handling system in the first power state when performing any one or more of the multiple different process tasks of the simultaneously-executing multiple different processes, and operating the one or more power-consuming hardware components of the information handling system in the second power state when not performing any of the simultaneously-executing multiple different process tasks of the simultaneously-executing multiple different processes.

6. The method of claim 5, further comprising using the at least one programmable integrated circuit to:

execute a designated scheduler logic;

execute a separate and different instance of scheduler logic to schedule process tasks for each respective one of the simultaneously-executing multiple different processes, and to provide task scheduling information for its respective one of the simultaneously-executing multiple different processes to the designated scheduler logic;

execute the designated scheduler logic to:

use the task scheduling information provided by all of the instances of separate and different scheduler logic of all of the simultaneously-executing multiple different processes to reschedule one or more of the target trigger times of the multiple different process tasks of each of the simultaneously-executing multiple different processes to respective actual performance times such that the actual performance times of each of the multiple different process tasks of the simultaneously-executing multiple different processes simultaneously occur together with the actual performance times of each other of the multiple different process tasks of the simultaneously-executing multiple different processes at a common synchronized performance time, and provide the common synchronized performance time to the respective separate and different instance of scheduler logic of each of the simultaneously-executing multiple different processes; and execute each of the respective separate and different instance of scheduler logic of each of the simultaneously-executing multiple different processes to cause its respective process to simultaneously perform the multiple different process tasks together at the common synchronized performance time such that all of simultaneously-executing multiple different processes simultaneously perform the multiple different process tasks of the simultaneously-executing multiple different processes together at the common synchronized performance time provided by the designated scheduler logic.

7. The method of claim 1, where the at least one programmable integrated circuit controls a power state of the one or more power-consuming hardware components; and where the second power state is a modern standby state.

8. The method of claim 1, where the information handling system is a battery powered information handling system; and where the operating the one or more power-consuming hardware components of the information handling system in the first power state comprises operating the one or more power-consuming hardware components of the information handling system on battery power in the first power state; and where the operating the one or more power-consuming hardware components of the information handling system in the second power state comprises operating the one or more power-consuming hardware components of the information handling system on battery power in the second power state.

9. An information handling system, comprising one or more power-consuming hardware components, and at least one programmable integrated circuit that controls a power state of the one or more power-consuming hardware components; where the at least one programmable integrated circuit is programmed to:

execute a process that implements multiple different process tasks, each of the multiple different process tasks being initially scheduled for performance at a designated target trigger time;

reschedule one or more of the target trigger times of the multiple different process tasks to respective actual performance times such that the actual performance times of each of the multiple different process tasks simultaneously occur together with the actual performance times of other of the multiple different process tasks at a common synchronized performance time, where to reschedule the one or more of the target trigger times of the multiple different process tasks, the at least one programmable integrated circuit is programmed to:

define sequential blocks of time as sequential schedule blocks that are available for scheduling of process tasks;

define each of the target trigger times for each given process task as respective target schedule blocks for the given process task;

define the common synchronized performance time as a synchronized schedule block for performing the multiple different process tasks together at the common synchronized performance time;

define a respective window of time as a task window around the target schedule block of each of the multiple different process tasks;

identify a next scheduled process task having the next upcoming task window of all the task windows of the multiple different process tasks;

determine a first group of the multiple different process tasks that includes the next scheduled process task and all other of the multiple different process tasks that have a respective task window that overlaps in time with the next upcoming task window of the identified next scheduled process task;

determine a first synchronized schedule block as the schedule block that is closest in time to the target schedule blocks of all the first group of the multiple different process tasks; and execute the process to simultaneously perform the multiple different process tasks together at the time of the first synchronized schedule block; and operate one or more power-consuming hardware components of the information handling system in a first power state when performing any one or more of the multiple different process tasks, and operate the one or more power-consuming hardware components of the information handling system in a second power state when not performing any of the multiple different process tasks, where the first power state is higher than the second power state.

10. The information handling system of claim 9, where to reschedule the one or more of the target trigger times of the multiple different process tasks, the at least one programmable integrated circuit is programmed to:

identify a next following scheduled process task having the next upcoming following task window that follows all of the target schedule blocks of the first group of the multiple different process tasks;

determine a second group of the multiple different process tasks that includes the next following scheduled process task and all other of the multiple different process tasks that have a respective task window that overlaps in time with the next upcoming following task window of the identified next following scheduled process task;

determine a second synchronized schedule block as the schedule block that is closest in time to the target schedule blocks of all the second group of the multiple different process tasks; and where the at least one programmable integrated circuit is further programmed to execute the process to simultaneously perform the second group of the multiple different process tasks together at the time of the second synchronized schedule block, and after executing the process to simultaneously perform the first group of the multiple different process tasks together at the time of the first synchronized schedule block.

11. The information handling system of claim 9, where to reschedule the one or more of the target trigger times of the multiple different process tasks, the at least one programmable integrated circuit is programmed to:

identify a next following scheduled process task having the next upcoming following task window that follows all of the target schedule blocks of the first group of the multiple different process tasks;

determine a second group of the multiple different process tasks that includes the next following scheduled process task and all other of the multiple different process tasks that have a respective task window that overlaps in time with the next upcoming following task window of the identified next following scheduled process task;

determine a second synchronized schedule block as the schedule block that is closest in time to the target schedule blocks of all the second group of the multiple different process tasks;

determine if at least one of the multiple different process tasks is included in both the first group of the multiple different process tasks and the second group of the multiple different process tasks;

then only if at least one of the multiple different process tasks is included in both the first group of the multiple different process tasks and the second group of the multiple different process tasks, then determine if any combination of a different first group and a different second group of the same multiple different process tasks results in a smaller time adjustment from the target schedule blocks of all of the multiple different process tasks to the first and second synchronized scheduled blocks than does the determined first and second groups of the multiple different process tasks; and then only if it is determined that a combination of the different first group and the different second group results in a smaller time adjustment from the target schedule blocks of all of the multiple different process tasks, then execute the process to simultaneously perform the different first group of the multiple different process tasks together at the time of the first synchronized schedule block, and execute the process to simultaneously perform the different second group of the multiple different process tasks together at the time of the second synchronized schedule block.

12. The information handling system of claim 9, where after the one or more of the target trigger times of the multiple different process tasks are rescheduled and before the process is executed, the at least one programmable integrated circuit is programmed to:

respond to a change to the multiple different existing process tasks that occurs due to at least one of an addition of a new process task to the multiple different existing process tasks or a removal of an existing process task from the multiple different existing process tasks, by rescheduling one or more of the target trigger times of the changed multiple different existing process tasks to respective actual performance times such that the actual performance times of each of the changed multiple different existing process tasks simultaneously occur together with the actual performance times of other of the changed multiple different existing process tasks at an updated common synchronized performance time; and execute the process to simultaneously perform the multiple different process tasks together at the updated common synchronized performance time.

13. An information handling system, comprising one or more power-consuming hardware components, and at least one programmable integrated circuit that controls a power state of the one or more power-consuming hardware components: where the at least one programmable integrated circuit is programmed to:

simultaneously execute multiple different processes that each implements multiple different process tasks, each of the multiple different process tasks of the simultaneously-executing multiple different processes being initially scheduled for performance at a designated target trigger time;

reschedule one or more of the target trigger times of the multiple different process tasks of each of the simultaneously-executing multiple different processes to respective actual performance times such that the actual performance times of each of the multiple different process tasks of the simultaneously-executing multiple different processes simultaneously occur together with the actual performance times of each other of the multiple different process tasks of the simultaneously-executing multiple different processes at a common synchronized performance time; and execute the simultaneously-executing multiple different processes to simultaneously perform the multiple different process tasks of the simultaneously-executing multiple different processes together at the common synchronized performance time;

operate the one or more power-consuming hardware components of the information handling system in a first power state when performing any one or more of the multiple different process tasks of the simultaneously-executing multiple different processes, and operating the one or more power-consuming hardware components of the information handling system in a second power state when not performing any of the simultaneously-executing multiple different process tasks of the simultaneously-executing multiple different processes, where the first power state is higher than the second power state.

14. The information handling system of claim 13, where the at least one programmable integrated circuit is programmed to:

execute a designated scheduler logic;

execute a separate and different instance of scheduler logic to schedule process tasks for each respective one of the simultaneously-executing multiple different processes, and to provide task scheduling information for its respective one of the simultaneously-executing multiple different processes to the designated scheduler logic;

execute the designated scheduler logic to:

use the task scheduling information provided by all of the instances of separate and different scheduler logic of all of the simultaneously-executing multiple different processes to reschedule one or more of the target trigger times of the multiple different process tasks of each of the simultaneously-executing multiple different processes to respective actual performance times such that the actual performance times of each of the multiple different process tasks of the simultaneously-executing multiple different processes simultaneously occur together with the actual performance times of each other of the multiple different process tasks of the simultaneously-executing multiple different processes at a common synchronized performance time, and provide the common synchronized performance time to the respective separate and different instance of scheduler logic of each of the simultaneously-executing multiple different processes; and execute each of the respective separate and different instance of scheduler logic of each of the simultaneously-executing multiple different processes to cause its respective process to simultaneously perform the multiple different process tasks together at the common synchronized performance time such that all of simultaneously-executing multiple different processes simultaneously perform the multiple different process tasks of the simultaneously-executing multiple different processes together at the common synchronized performance time provided by the designated scheduler logic.

15. The information handling system of claim 9, where the at least one programmable integrated circuit is a host programmable integrated circuit of the information handling system.

16. The information handling system of claim 9, where the information handling system is a battery powered information handling system; and where the at least one programmable integrated circuit is programmed to operate the one or more power-consuming hardware components of the information handling system on battery power while in the first power state; and where the at least one programmable integrated circuit is programmed to operate the one or more power-consuming hardware components of the information handling system on battery power while in the second power state.

* * * * *